Figure 1:
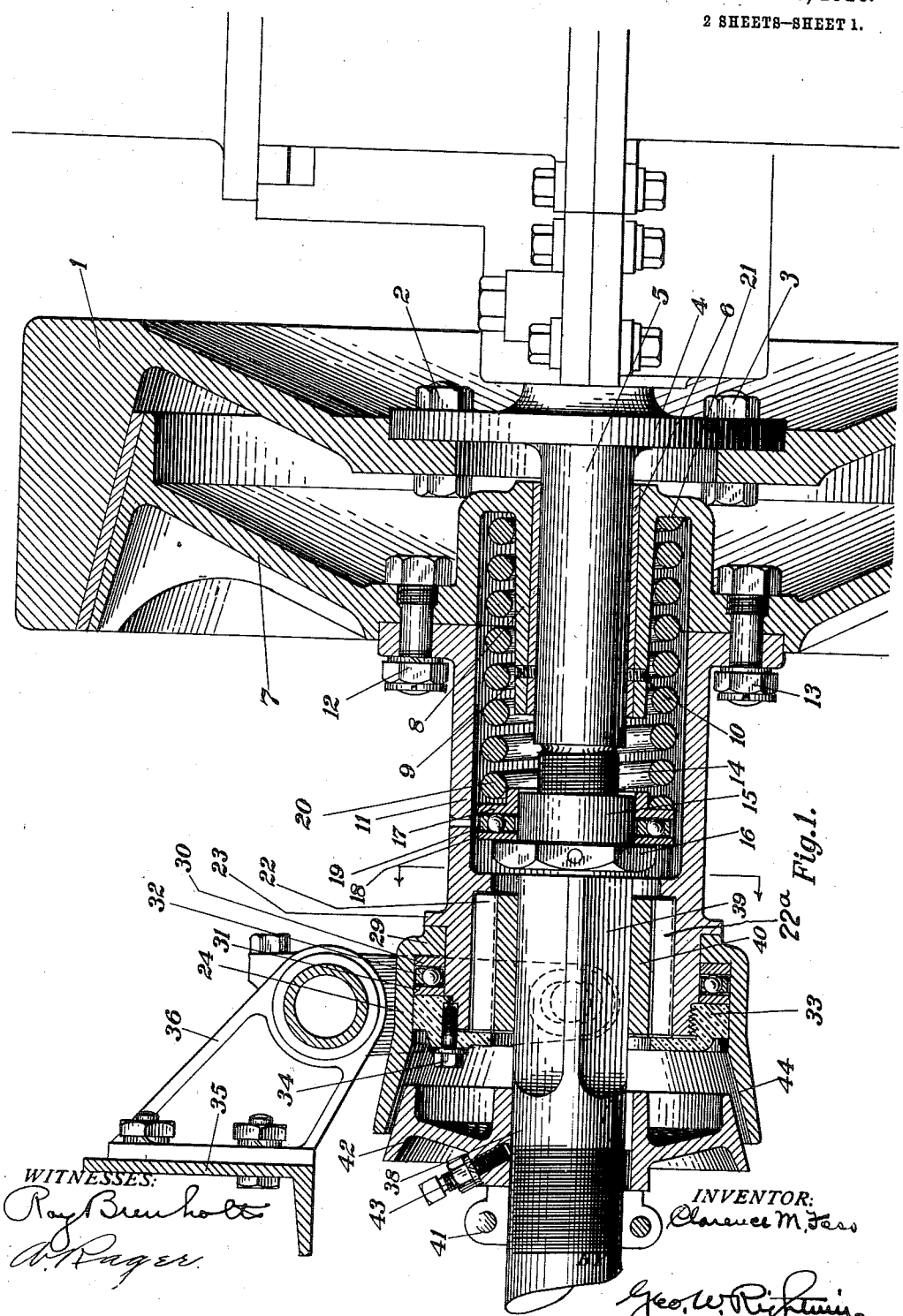

UNITED STATES PATENT OFFICE.

CLARENCE M. FOSS, OF COLUMBUS, OHIO, ASSIGNOR TO THE SEAGRAVE COMPANY, OF COLUMBUS, OHIO, A CORPORATION OF OHIO.

CLUTCH-BRAKE.

973,187.  Specification of Letters Patent.  Patented Oct. 18, 1910.

Application filed October 4, 1909. Serial No. 520,918.

*To all whom it may concern:*

Be it known that I, CLARENCE M. FOSS, a citizen of the United States, residing at Columbus, in the county of Franklin and State of Ohio, have invented certain new and useful Improvements in Clutch-Brakes, of which the following is a specification.

My invention relates to improvements in a clutch brake adapted to be interposed between the motor shaft and the transmission gearing; it includes especially a sleeve clutch under the influence of a spring thrust carrying a shifter collar, said sleeve being adapted to drive a shaft leading to the transmission gearing and on this shaft is mounted a brake drum; by appropriately shifting the clutch, the clutch spider is thrown out of engagement with the fly wheel and by the same movement the shifter collar is brought into engagement with the brake drum, thereby slowing down the transmission shaft and bringing it to rest by means of a brake construction operated with the clutch. Consequently the same movement of parts which clutches the transmission shaft into the fly wheel releases the brake drum, and the same movement which unclutches the transmission shaft from the fly wheel also associates the parts in such a way as to put the brake upon the transmission shaft. The compactness of arrangement of parts and the simplicity of construction and ease of manipulation are the features upon which especial stress is laid herein.

My clutch brake is used primarily at the time of starting the vehicle upon which the transmission gearing is used; when the engine is started as usual, the clutch being thrown in to the fly wheel, one of the transmission gearing shafts is thereby rotated. The sliding gear on the companion or parallel shaft must then be moved into mesh with one of the stationary gears on the rotating transmission gearing shaft before power may be transmitted to the driving wheels. To accomplish this, the clutch brake is momentarily brought into use, thereby quickly slowing and bringing to rest the shaft of the transmission gearing which has the gears fixed thereon, and this being done, the shifting gear on the companion parallel shaft is brought into mesh with whichever of the gears on the other shaft may be desired. The brake is then thrown off, and the same movement of parts establishes the relation between the fly wheel and the clutch spider, and the transmission gearing is thereby driven to communicate motion to the rear driving wheel. This is especially the function which my improved mechanism has in the construction shown and described herein, and I contemplate its use primarily with fire department automobile apparatus, and it is therefore of considerable importance. Of course it may be used with vehicles of any kind which are motor driven.

Figure 2:
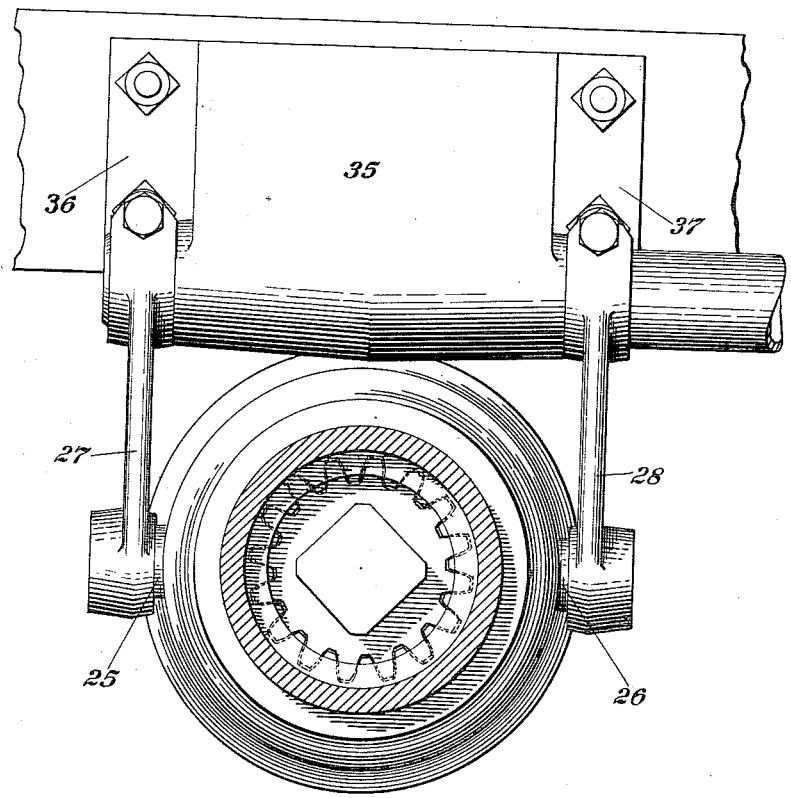

In the drawings which accompany this specification and form a part thereof, Figure 1 is a vertical longitudinal section through the chief parts of the mechanism; Fig. 2 is an end view of the shifter collar showing the means of suspension and control thereof.

Referring to the drawings, 1 indicates a fly wheel bolted at 2 and 3 on a flange 4 formed on the motor shaft, said shaft being provided with the sleeve bearing 6; a clutch spider 7 is formed with the recessed or sleeved bearing 8 to fit upon the bearing member 6, and to be secured thereon by means of the dowels shown at 9 and 10. A clutch sleeve 11 is secured to the clutch spider 7 by means of the bolts 12 and 13.

The shaft 5 is threaded at its inner end as appears at 14, and has the collar 15 mounted thereon and the nut 16 confining the same in place. Surrounding the collar are the bearing plates 17 and 18, confining between them the ball retainer 19, these elements being adapted to take the thrust of the coil spring 20, which is seated in the sleeve bearing 8 and the sleeve 11, and bears at one end against the lower end 21 of the sleeve bearing 8 and at its other end against the bearing plate 17. It is seen that the effect of the spring is to tend to engage the clutch spider 7 with the drive wheel 1, and the intensity of this effect is regulated by the compression put upon the spring 20 by means of the nut 16.

The sleeve 11 has integrally formed thereon internal gear teeth shown in dotted lines at 22$^a$, and on the outside of the sleeve 11 against the shoulder 23 is mounted a shifter collar 24 which is loose upon the sleeve; at either side of this shifter collar are provided extensions or lugs 25 and 26 adapted to be engaged by the links 27 and 28, and to be supported and manipulated thereby. A shifter collar is formed with the engaging flange 29 thereon, and the bearing plates 30 and 31 are mounted on the sleeve 11 internally of the shifter collar, and, confined between them, is the ball retainer 32, these members being adapted to take the thrust of the shifter collar; they are held in place by the cap member 33, which is threaded on to the sleeve 11, and is then additionally secured thereon by means of the set screws shown at 34. The links 27 and 28 are supported on the frame 35 of the machine or vehicle by means of the brackets 36 and 37. Appropriate means may be provided for manipulating the shifter.

A shaft 38, squared as appears at 39 has mounted thereon at one end, not shown, the transmission gearing, and its other end is adapted to be inserted into the sleeve 11, as appears in Fig. 1; mounted on the square of this shaft 38 is a pinion 40 having teeth 22 adapted to mesh with the gear 22ª formed integrally on the sleeve 11, whereby the motion of the fly wheel is transmitted through the clutch spider 7 and the sleeve member 11 to the transmission shaft 38 and thence to the transmission gearing. Mounted on the shaft 30 and secured thereon by the clamp 41 is a brake drum 42, which is additionally fixed on the shaft 38 by means of the set screw 43, and which is therefore permanently located on the shaft 38. It is seen that the shaft 38 and the brake drum 42 thereon have the motion of the sleeve 11, the latter being actuated through the engagement of the clutch spider 7 with the fly wheel 1. This engagement is effected by swinging the arms 27 and 28 supporting the shifter collar 24, in an appropriate direction with well known means, whereupon the power is carried to the transmission gearing. When it is desired to stop the mechanism, the shifter collar 24 is drawn forward by means of the link construction, thereby disengaging the clutch spider from the fly wheel and at the same time engaging the flaring portion 44 of the shifter with the brake drum 42, thereby tending to lock together these elements. The effect is readily seen to be a gradual stopping of the rotation of the shaft 38 and the consequent bringing to rest of the transmission gearing. The manipulation of the brake takes place with the same movement that causes the separation of the clutch and fly wheel, and the releasing of the brake takes place by the same movement that engages the clutch with the fly wheel. Therefore my construction is very compact, and is so formed that only one act on the part of the operator is necessary to unclutch and to brake, and a single act only is required to clutch and release the brake. Therefore this device is absolutely safe in its operation, as the braking effect can not be produced without first unclutching the parts and the parts can not be clutched together without first releasing the brake.

Modifications of the construction herein shown may be made, and I do not therefore confine my invention to the specific form shown and described, but desire to have the advantage of any modifications which lie within the scope of the appended claims.

What I claim is:

1. In a transmission mechanism, a motor shaft and a transmission shaft, a clutch spider mounted on said motor shaft, a sleeve secured thereto surrounding said shafts, a shifter collar on said sleeve, a brake drum on said transmission shaft, and means for manipulating said sleeve in one direction to engage the said sleeve with said brake drum and to release the clutch spider, and for moving said sleeve in the opposite direction to release said brake and engage said clutch spider.

2. In a clutch brake construction, a motor shaft and a transmission shaft, a clutch spider mounted on said motor shaft, a sleeve secured thereto surrounding said shafts, a connection between said sleeve and said transmission shaft, a shifter collar on said sleeve, a brake drum on said transmission shaft, and means for actuating said sleeve in one direction to engage said collar and brake drum and to release the engagement of said clutch spider, and for actuating said sleeve in the opposite direction to engage said clutch spider and to release said collar from said brake drum.

In testimony whereof I affix my signature in the presence of two witnesses.

CLARENCE M. FOSS.

Witnesses:
A. G. Crouse,
C. W. Black.